United States Patent [19]
Suitts et al.

[11] Patent Number: 5,406,870
[45] Date of Patent: Apr. 18, 1995

[54] METHOD AND APPARATUS FOR CUTTING TUBING

[75] Inventors: Terry R. Suitts, Centerville; Rick L. Kelly, Kettering, both of Ohio

[73] Assignee: The Vulcan Tool Company, Dayton, Ohio

[21] Appl. No.: 120,596

[22] Filed: Sep. 13, 1993

[51] Int. Cl.⁶ ............................................. B23D 21/14
[52] U.S. Cl. ........................................ 83/23; 83/54; 83/193; 83/364
[58] Field of Search ............... 83/54, 189, 191, 364, 83/23, 192, 193, 149

[56] References Cited

U.S. PATENT DOCUMENTS

| | | | |
|---|---|---|---|
| 1,715,138 | 5/1929 | Lothrop | 83/162 |
| 2,435,469 | 2/1948 | Roof | 164/40 |
| 2,516,451 | 7/1950 | Daukus | 164/40 |
| 2,627,921 | 2/1953 | Brehm | 164/40 |
| 2,837,156 | 6/1958 | Brehm | 164/40 |
| 2,856,997 | 10/1958 | Lafferty | 164/40 |
| 3,657,951 | 4/1972 | Clark | 83/54 |
| 4,003,278 | 1/1977 | Shields | 83/186 |
| 4,205,569 | 6/1980 | Horn et al. | 83/82 |
| 4,283,974 | 8/1981 | Kline | 83/364 |
| 4,328,725 | 5/1982 | Gschwend | 83/27 |
| 4,534,002 | 8/1985 | Urban | 364/475 |
| 4,631,998 | 12/1986 | Borzym | 83/145 |
| 4,635,514 | 1/1987 | Borzym | 83/196 |
| 4,724,696 | 2/1988 | Sumino | 72/203 |
| 4,794,834 | 1/1989 | Werner | 83/185 |
| 4,889,023 | 12/1989 | Languillat | 83/54 |
| 4,944,206 | 7/1990 | Guy et al. | 83/42 |
| 5,031,493 | 7/1991 | Dorr | 83/13 |
| 5,105,700 | 4/1992 | Kusakabe | 83/318 |
| 5,109,740 | 5/1992 | Kohn | 83/15 |

Primary Examiner—Kenneth E. Peterson
Attorney, Agent, or Firm—Thompson, Hine and Flory

[57] ABSTRACT

A method and apparatus for cutting tubing in which uncut tubing is fed over punches connected to an arbor extending the length of a machine from a cutting head. The cutting head includes dies operative with the punches to cut the tubing into tubing pieces. Lengths of tubing are received by a carriage and cut into the tubing pieces. The carriage is capable of detecting the leading edge of the tubing and the trailing edge of the tubing. The lengths of tubing and tubing pieces have a unidirectional material flow to the end of the apparatus.

15 Claims, 11 Drawing Sheets

METHOD AND APPARATUS FOR CUTTING TUBING

FIELD OF THE INVENTION

The invention relates to a process for cutting tubing and a machine for implementing the process. In particular, the invention provides a method for operating a semi-intelligent tube cutting machine to unidirectionally move lengths of tubing and cut tubing pieces the length of the machine for discharge from an end of the machine remote from a cutting head. The tube is fed into the tube cutter on a carriage which includes means for detecting the leading edge of the tube and for detecting the trailing edge of the tube. The carriage also knows its own location with respect to the die.

BACKGROUND OF THE INVENTION

It is well known to cut tubing utilizing a cutting head comprised of fixed and movable dies, each having an aperture for receiving the outside surface of the tubing, and fixed and movable punches inserted in the tubing and concentrically located within the fixed and movable dies. The fixed and movable punches are located such that their line of separation lies within a shearing plane defined by the line of separation between the fixed and movable dies. The tubing is cut by moving the movable die and punch with respect to the fixed die and punch thereby causing a plastic deformation of the tubing material within the shear plane such that the tubing being held by the movable die and punch breaks away or is sheared from the tubing being held within the fixed die and punch. The movable punch experiences motion relative to the fixed punch as the tubing material surrounding the movable punch is moved by the movable die.

The motion of the movable die relative to the fixed die may be achieved by the successive operation of actuators connected to move the movable die in perpendicular directions parallel to the shear plane. The cutting head described above is known as a BREHM cutting head and is commercially available from Vulcan Tool Corporation, the assignee of the present application.

In order to obtain the optimum tube cutting characteristics, it is necessary that the line separating the fixed and movable punches inside the tubing be set and maintained in a predetermined alignment with the line separating the fixed and movable dies which defines the shear plane. There are several techniques for holding the punches in position. The punches may be mounted on a fixed arbor, a movable arbor, or may be held in place by a separate restraining device held in the tubing itself. The latter two techniques have practical limitations in terms of their application, and the present invention is directed to tube cutting machines utilizing a fixed arbor for holding the punches. For larger tubing diameters, the movable and fixed punches are held together by means of a tensioning rod which permits relative motion between the punches in a direction perpendicular to a central longitudinal axis common to both punches.

With a typical BREHM type tube cutting machine, tubing segments of standard mill lengths of up to 20 feet (6 m) are held on a separate loader mechanism having an independent power source. The loader mechanism directs the tubing through a cutting head on the tube cutting machine and onto a leading arbor contiguous with the fixed punch, that is, an arbor leading into an input side of the cutting head. The arbor length is sufficient to accommodate the tubing segment, e.g. 20 feet (6 m), and the arbor is anchored at an end of the machine opposite the cutting head. At its anchor point, the arbor contains an adjusting mechanism that permits the arbor and connected punches to be adjusted relative to the dies so that the parting line between the punches lies in the shear plane. A feed mechanism on the tube cutting machine feeds the tube segment back through the cutting head against an adjustable finger stop which measures a desired cut tubing length and signals the machine to cease the feed motion. Thereafter, the cutting head shears the desired length of tubing from the tubing segment.

Since the arbor supporting the tubing is over 20 feet (6 m) long, to minimize arbor droop, the arbor has a diameter that is substantially equal to the inside diameter of the tubing segment which makes loading and feeding of tubing more difficult. In addition, tubing segments with a camber or curve over their length either have to be straightened or cut into shorter lengths so that they do not bind on the arbor. Further, for a machine designed to handle tubing segments of 20 feet (6 m), the total length of the loader mechanism and the tube cutting machine is well over 40 feet (12 m).

To minimize friction in feeding the tubing segment over the punches, the fixed punch has a slightly larger diameter than the movable punch. However, during the loading operation, when the tubing segment is transferred over the movable punch and then over the fixed punch, the lesser diameter of the movable punch is next to the larger diameter of the fixed punch which forms an aggressive step which may score the inside surface of the tubing.

There are several aspects of BREHM type tube cutting machines which can be improved. The environment in which the tube cutting machine is used may have substantial temperature variations over its period of operation resulting in a longitudinal thermal expansion of the arbor which adversely affects the position of the punches relative to the dies. The longer the arbor, the greater the linear expansion from its point of support.

The tubing segments experience a bidirectional flow which requires that the tubing pass through the dies and over the punches twice. Not only does the tubing have two opportunities to be scored, but edges of the dies and punches are exposed to additional wear.

After being loaded onto the leading arbor, the tubing segment is cut into tubing pieces; and the tubing pieces are discharged from the same end of the machine that the tubing segment was loaded. The discharge point is the approximate midpoint of the combination of the loader mechanism and the tube cutting machine. Typically, in a high production environment, the loader mechanisms and tube cutting machines have only a walk aisle between them; and the discharged tubing pieces are manually carried to a material flow path at an end of the machine.

SUMMARY OF THE INVENTION

The present invention provides a tube cutting machine in which the loader and feed mechanisms are integrated for feeding tubing through a cutting head. Sheared tubing pieces move unidirectionally from the loader and feed mechanism for discharge at one end of the machine remote from the cutting head. The tube is fed into the tube cutter on a carriage which includes means for detecting the leading edge of the tube and for detecting the trailing edge of the tube. The carriage also knows its own location with respect to the die. The present invention utilizes a trailing arbor contiguous with one of the punches for maintaining the punches in a predetermined alignment with the dies. The trailing arbor is alternately secured at two different locations to facilitate motion of the tubing pieces over the length of the machine without disconnecting the arbor from the punches or moving the arbor and punches relative to the dies.

The tube is fed into the tube cutter on a carriage which includes means for detecting the leading edge of the tube and for detecting the trailing edge of the tube. The carriage also knows its own location with respect to the die. Knowing the leading edge and the position of the carriage, the carriage can be moved into the die to a point at which a tube of a desired length can be cut off. Similarly, by detecting the trailing edge of the tube and knowing the position of the carriage, the machine can know when a scrap piece is generated.

Integration of the loader and feed mechanism with the tube cutting machine has as an advantage of unidirectional flow of the tubing pieces over the length of the machine. Unidirectional flow allows for discharge at an end of the machine adjacent a material flow path and therefore eliminates the need for manual handling typically used with other machine designs.

Unidirectional tubing flow permits the movable punch to have a smaller diameter than the stationary punch. Therefore, tubing is always feeding from a larger diameter to a smaller diameter, and the probability of scoring the interior surface of the tubing is reduced. With the previous leading arbor design, the difference in diameters between the fixed and movable punches was in the range of 0.002 inches (0.05 mm). With the present invention, satisfactory tubing cuts may be made with the difference in diameter exceeding 0.010 inches (0.254 mm), thereby substantially reducing tooling costs. Further, tubing passes the dies and punches only a single time thereby minimizing the opportunity for scoring of the interior tubing surface as well as wear on the dies and punch edges.

Since the tubing pieces are substantially shorter than the uncut tubing, the trailing arbor is substantially shorter thereby substantially shortening the length of the tube cutting machine. With the present invention, the combination of the loader and tube cutting machine may be reduced in length up to 30% over the previous designs.

With a shorter trailing arbor, arbor droop is less of a problem; and substantially smaller arbor diameters may be used. Therefore, lengths of tubing that have a substantial camber or curve over their length may be processed. A shorter trailing arbor has the further advantage of lessening the magnitude of thermal expansion of the arbor.

DETAILED DESCRIPTION

Figure 1:
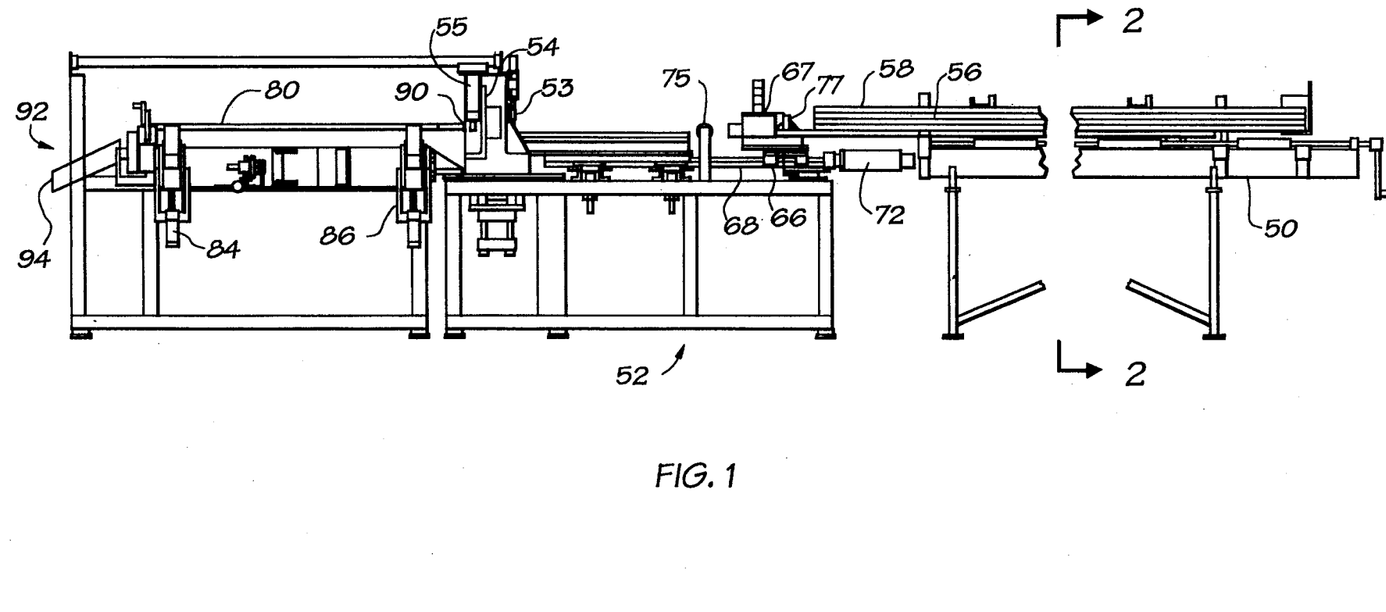
FIG. 1 is a schematic front view of a first embodiment of a tube cutter and loader of the present invention.
Figure 2:
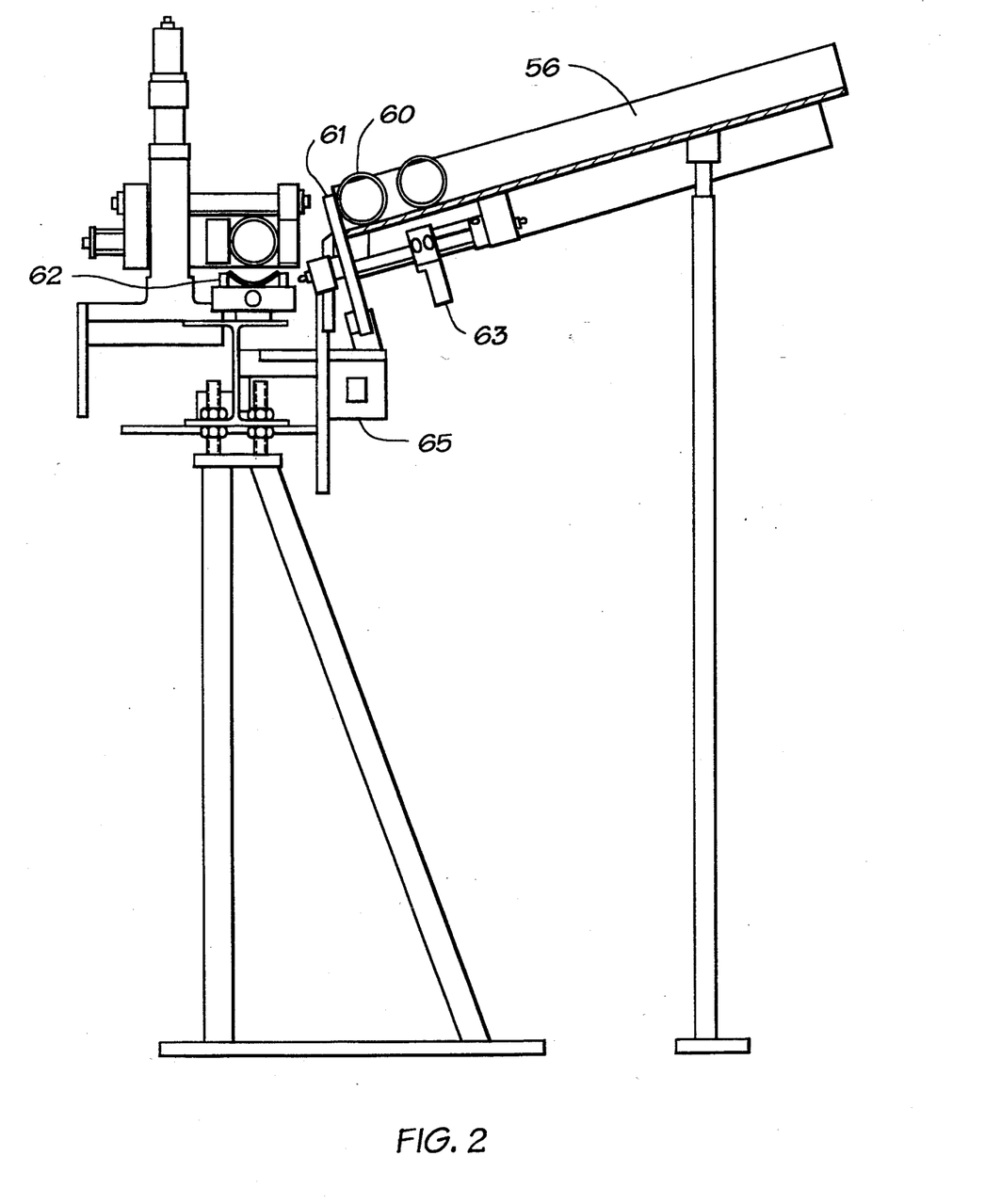
FIG. 2 is section view of the loader taken along the section line 2—2 of FIG. 1.
Figure 3:
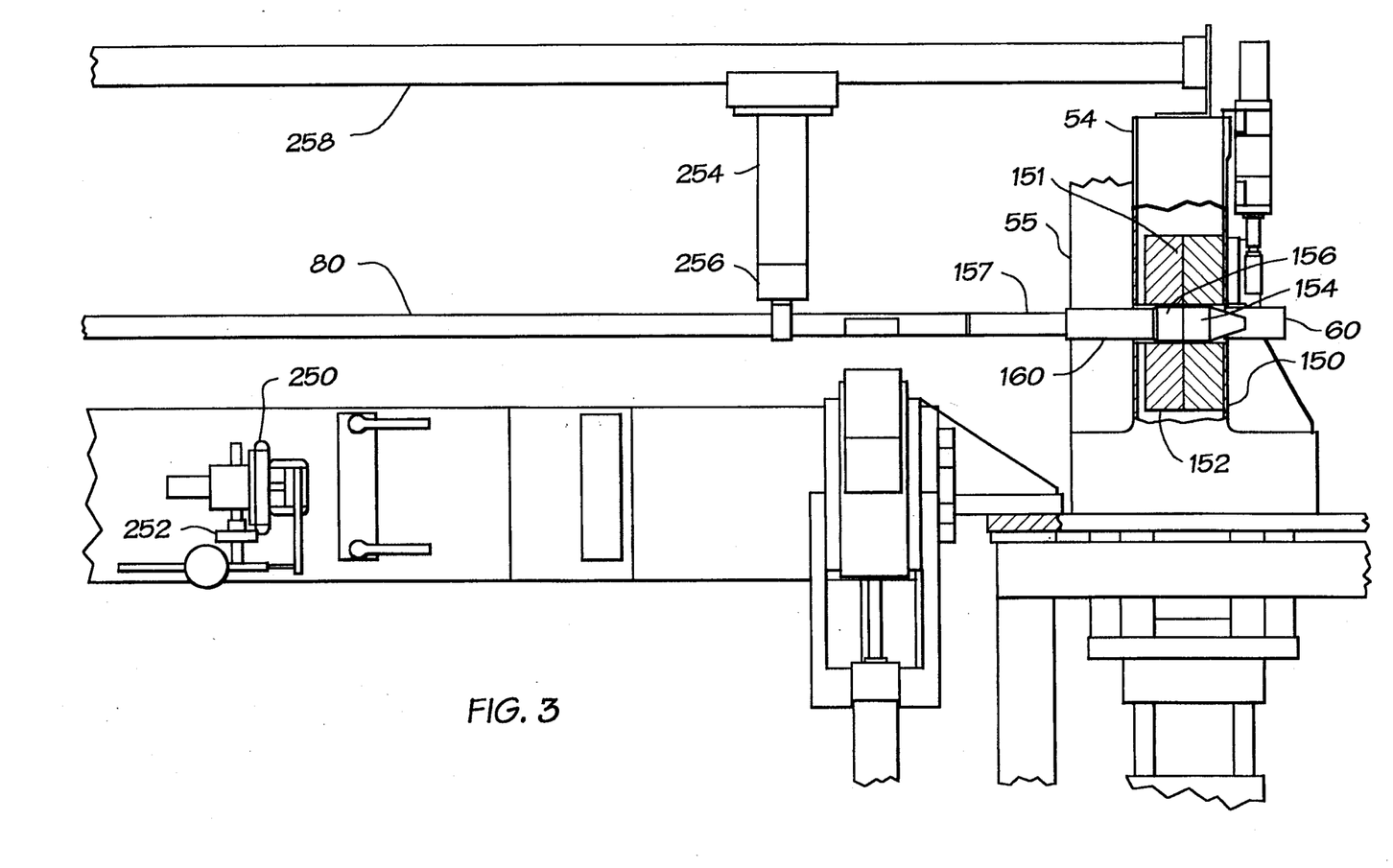
FIG. 3 is a schematic front view of a cutting head utilized with the present invention.

FIGS. 1 and 2 are schematic front and section views, respectively, of a first embodiment of the present invention. A tubing loader 50 is connected to one end of a tube cutting machine 52 and adjacent a cutting head 54. The loader 50 contains a storage rack or magazine 56 for storing a number of tubing segments 58. Referring to FIG. 2, by means of a segmenting and gate mechanism known in the art, a tubing segment 60 is moved to a location between a gate 61 and transfer arm 63. Actuator mechanism 65 operates the transfer arm 63 to move the tubing segment from the magazine 56 to the rollers 62. Several of such gates and arms may operate together to control a long tubing segment. Rollers 62 support the tubing during the feeding operation into the tube cutting machine 52. One or more detectors 75, such as infrared presence sensors or photoelectric sensors, are used to detect the presence and proper position of a length of tubing on the rollers 62. Tubing segment 60 is fed from the loader 50 into an input side 53 of the cutting head 54 by a carriage 67 including a hitch feed clamp. The carriage is driven by a drive mechanism comprised of a ball screw 68 connected to a motor 72. The motor drives the ball screw 68 and the feed clamp carriage 67, thereby moving the tubing 60 by means of the feed clamp jaws, between the two ends of the loader mechanism 50. Proximity detectors 75 and 77 control the travel of feed clamp carriage 67. The cutting head 54 is a Brehm style cutting head comprised of fixed and movable punches 154 and 156 surrounded by fixed and movable dies 150 and 151, as illustrated in FIG. 3.

The loader mechanism 50 feeds tubing segment over the punches in the cutting head 54 onto a trailing arbor 80 connected to the punch on the output side of the cutting head 54. The trailing arbor is contiguous with the movable punch and is alternately supported at two locations as described below, thereby permitting unidirectional tubing flow from the cutting head to an end of the machine remote from the cutting head. The arbor 80 extends from an output side 55 of cutting head 54 and maintains the punches in a predetermined alignment with respect to the dies. A first means 84 secures the arbor to maintain the predetermined alignment of the punch with the dies, and a second means 86 secures the arbor to maintain the predetermined alignment of the punch with the dies. The first and second securing means include means for limiting movement of the arbor and movable punch in a direction parallel to a longitudinal axis of the arbor, and means for limiting rotational movement of the arbor about the longitudinal axis.

The feed clamp carriage 67 includes a means for detecting the leading edge of the tube and the trailing edge of the tube. The carriage 67 also knows its own location with respect to the die. The carriage moves back and forth along the length of the tube by a screw drive type of mechanism. The carriage grips the tube and then advances the tube a predetermined distance into the tube cutting die where a length of tube is cut off.

Initially, a sensor determines if a length of tubing is available to be clamped by the carriage 67. If so, the carriage clamps the available tubing. As the length of tube is being transported, the leading edge of the tube is detected by sensor 75, and the location of the carriage 67 is determined. The machine then calculates the relative tube position and advances the leading edge of the tube a fixed distance across the cut line to make a crop cut. The carriage 67 then retracts and clamps the tube at a location farther from the leading edge and advances the tube forward as each cut is made until the sensor 77 detects a trailing edge of the tube. Upon sensing the trailing edge of the tube, the machine calculates the carriage position and signals the machine as to the relative position of the tube end. Knowing the number and size of cuts desired, and having determined the length of tubing remaining to be cut, the machine then calculates the number of remaining cuts that are possible with the current length of tubing, and the cuts are made.

When the proper length of tube is positioned to be cut off, the screw drive 66 ceases operation, the cutting operation is initiated, and a tubing piece is sheared from the tubing segment by cutting head 54. Screw drive 66 continues to incrementally feed the tubing segment through the cutting head 54 for additional cutting operations.

Since it is preferred that the arbor remain in a fixed position during a cycle of operation, the arbor is alternately supported at two different points by a primary arbor support 84 and a secondary arbor support 86. The primary arbor support 84 is utilized during the cutting operation at which time the secondary arbor support 86 is disengaged from the arbor 80. As the feed and cutting cycles are repeated, sheared tubing pieces are pushed along the arbor 80.

The above cycle is repeated a number of times until a predetermined length or number of tubing pieces have been cut and are collected on the arbor 80. At that point, a transport mechanism 90 moves the tubing pieces past the secondary arbor support 86 as described later. The transport mechanism stops; the secondary arbor support 86 engages the arbor 80; and primary arbor support 84 disengages the arbor 80. Thereafter, the transport mechanism is moved toward an end of the machine 92 remote from the cutting head 54. During the progress of that motion, cut tubing pieces are pushed off the end of the arbor 80 onto a chute 94 thereby discharging the cut tubing pieces from the end of the machine 92 opposite from the cutting head. When an optical detector 77 on carriage 67 detects the trailing end of the tube, a scrap piece is indicated which will be advanced through the die without cutting for disposal. The net result is that there is a unidirectional flow of tubing from the loader 50, through the cutting head 54, over the arbor 80 and off the end of the machine 92.

FIG. 3 is a schematic front view of the cutting head 54 comprised of a stationary die 150, a movable die 152, a stationary punch 154, and a movable punch 156. A shear plane is defined at the junction line 151 between the dies 150 and 152. The position of the punches 154 and 156 is adjusted such that the junction line between the punches lies in the shear plane. The arbor 80 is threadedly connected to the punch assembly 154, 156 and extends from the output side 55 of the cutting head 54. The diameter of the fixed punch 154 is typically 0.003 inches (0.075 mm) less than the minimum internal diameter of the tubing 60. The diameter of the movable punch section 156 is typically 0.001 inches (0.025 mm) less than the diameter of the stationary punch 154. However, the movable punch diameter may be more than 0.010 inches (0.254 mm) less than the stationary punch diameter. The diameters of the apertures in the stationary and movable dies may likewise vary by similar magnitudes. The lesser diameter of the movable punch reduces friction as the tubing segment 60 is fed through the cutting head.

The diameter of the movable punch 156 is further reduced at 157 to a diameter equal to the minimum tubing inner diameter less approximately three wall thicknesses of the tubing 60. Therefore, as tubing pieces 157 and 160 are sheared from the tubing segment 60, they drop down onto the reduced diameter of the movable punch 156 and are pushed onto the arbor 80. For tubing pieces having a longer length, it may be necessary to bump-feed the tubing in order to place it in a proper position on the arbor 80. A bump-feed is simply an incremental feed of the uncut tubing segment 60 which places the cut tubing piece 160 in a position to be grasped by the transport mechanism 90 as discussed later. Although the arbor 80 is shown connected to the movable punch 156, the invention is equally applicable to an inverse arrangement. In that case, the arbor would be connected to a fixed punch and extend from the output side of the cutting head. The movable die and punch would be on the cutting head input.

Figure 4:
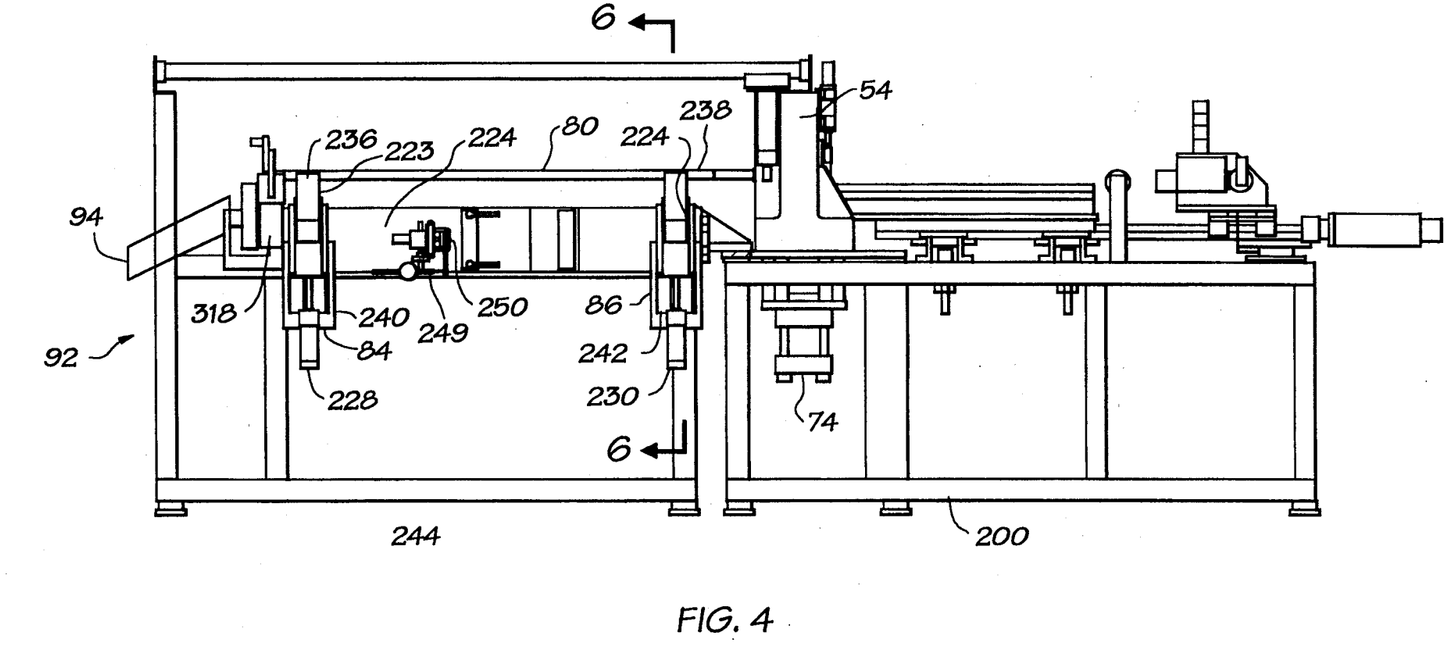
FIG. 4 is a schematic front view of a tube cutter utilizing a first embodiment of the present invention.
Figure 5:
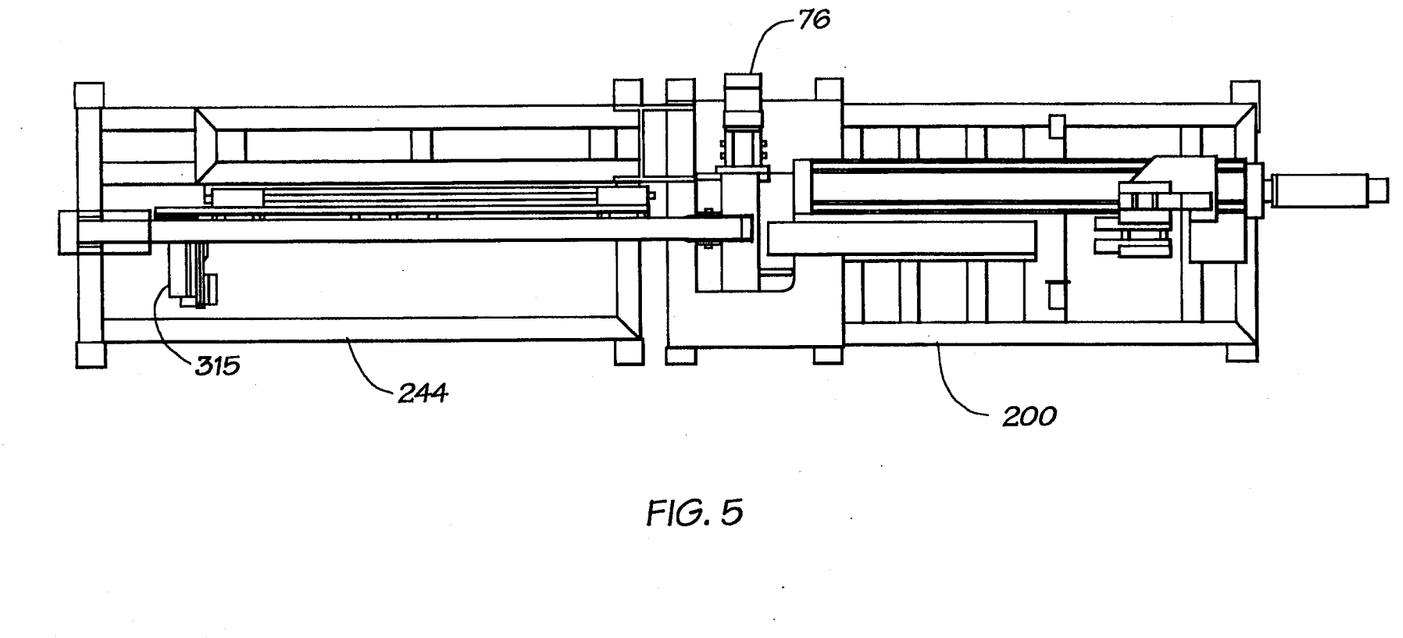
FIG. 5 is a schematic top view of a tube cutter utilizing the first embodiment of the present invention.
Figure 6:
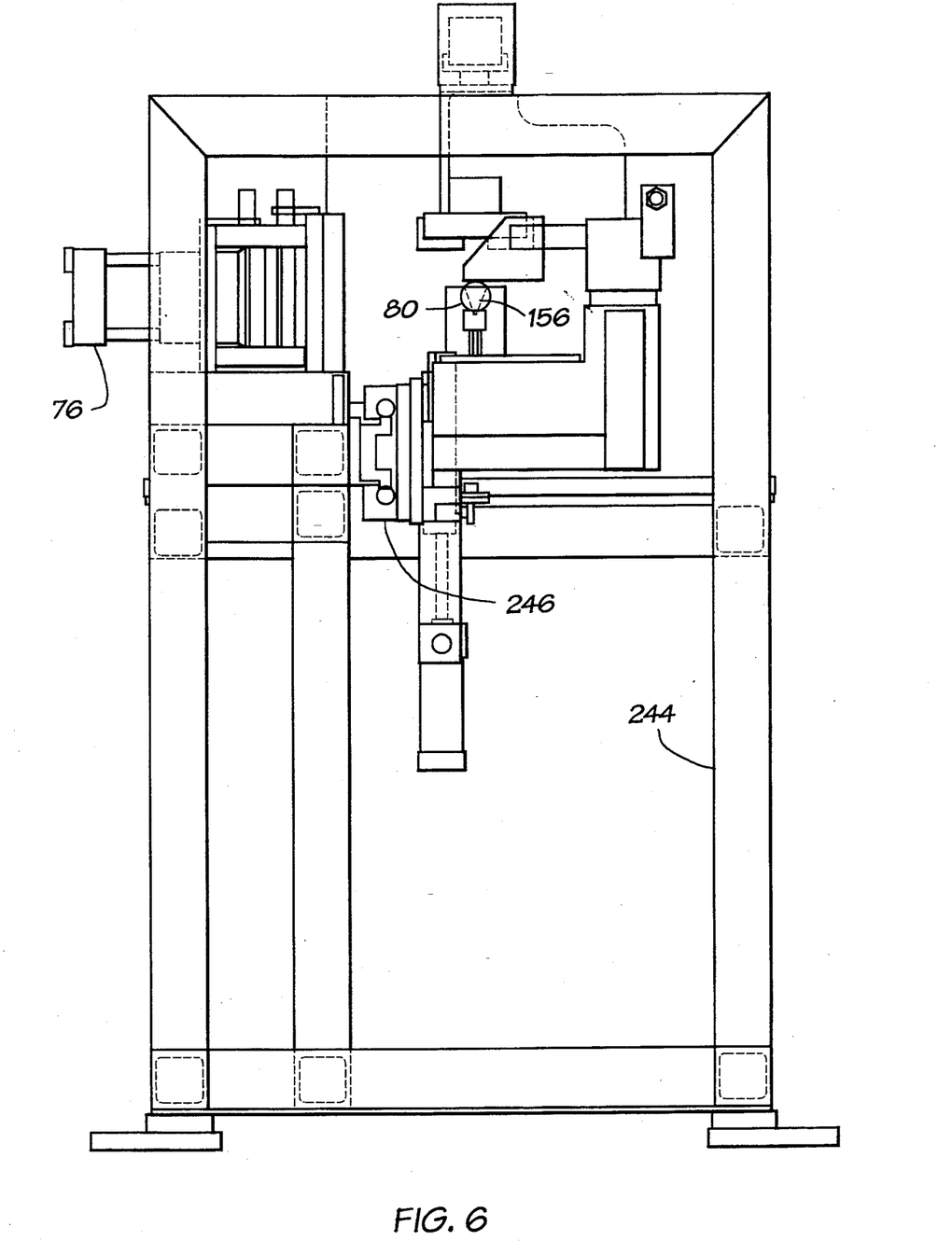
FIG. 6 is section view taken along the section line 6—6 of FIG. 4.

FIGS. 4, 5 and 6 are front, top and right end views, respectively, of the tube cutting machine 52 illustrated schematically in FIG. 2. The machine is supported by a fabricated base member 200. The cutting head 54 is mounted on the base 200 and hydraulic cylinders 74 and 76 are connected to the cutting head 54 to provide vertical motion and horizontal motion, respectively, of the movable die.

Continuing with FIGS. 1-6, attached to the movable punch 156 is a trailing arbor 80 which is supported at two places by a primary arbor support 84 and a secondary arbor support 86. In this embodiment, the secondary arbor support may be anywhere between the first arbor support and cutting head. The exact location of the arbor support is dependent on the application. In the first embodiment, the secondary arbor support is preferably located close to the cutting head at a position in which there is no interference. Each arbor support 84, 86 contains a V-block 223, 224. The arbor supports are actuated by cylinders 228 and 230, for moving the arbor supports into and out of engagement with the arbor 80 in response to selected fluid flow within the cylinders 228 and 230. The V-blocks are varied to accommodate differing arbor sizes. The arbor has V-shaped grooves 236 and 238 which mate with the V-blocks 223, 224, respectively. Upon an arbor support engaging the arbor, the arbor is locked in position and prevented from moving either rotationally or in a direction parallel to a central longitudinal axis of the arbor 80. Therefore, the arbor and punch assembly are always maintained in a position such that the punches are held in a predetermined alignment with the dies in the shear plane.

The cylinders 228 and 230 are connected to supports 240 and 242 which are fixed to a table 244. The table 244 is mounted on rails or ways 246 (FIG. 6) thereby providing horizontal motion parallel to the longitudinal axis of the arbor. By raising and lowering the position of the table 244, arbor supports 84 and 86, and the arbor 80, and the connected punch assembly of cutting head 54 permits the predetermined alignment between the punches and the dies to be established and subsequently adjusted. Motion of the table 244 is facilitated by the use of a rack and pinion, worm and gear, the illustrated screw actuator drive 249, or another positioning mechanism. The screw drive unit 249 is connected to the input shaft 250 and hand wheel 252 thereby permitting manual adjustment of the position of the table 244.

Transport 90 includes an unload gripper 254, comprised of gripping jaws 256 and rodless cylinder 258, effective to grasp a tubing piece (not shown) within the gripping jaws 256. The gripper 254 shuttles cut tubing between the cutting head 54 and the end of the machine 92 remote from the cutting head. Tubing pieces move to the end of the machine 92 fall off the arbor 80 into a chute 94 thereby being discharged from the machine.

As the tube is being shuttle unloaded, the carriage 67 retracts to obtain a fresh grasp on the tube being cut, on the upstream side of the cutting head. During the carriage retract, a sensing means such as an infrared sensor 77, built into the carriage, searches for the end of the tube. Upon sensing the end of the tube, the controller determines the carriage position and signals the machine the relative position of the tube end. Through programming, the machine is capable of handling the end of the tube to sequence the scrap through the downstream operations such that the scrap is discarded separately from the cut tubing. The same occurs for the tube lead end. As the carriage 67 retracts to gather the newly dropped tube mill length, the tube is grasped by the carriage 67 and advanced past the infrared sensor to calculate the relative tube position. Again, through programming, the machine is capable of handling the crop cut. Hence, the machine of the present invention has semi-intelligence to shuttle the cut pieces downstream and work continuously without a mechanical stop finger to determine the tube cutoff length.

Figure 7:
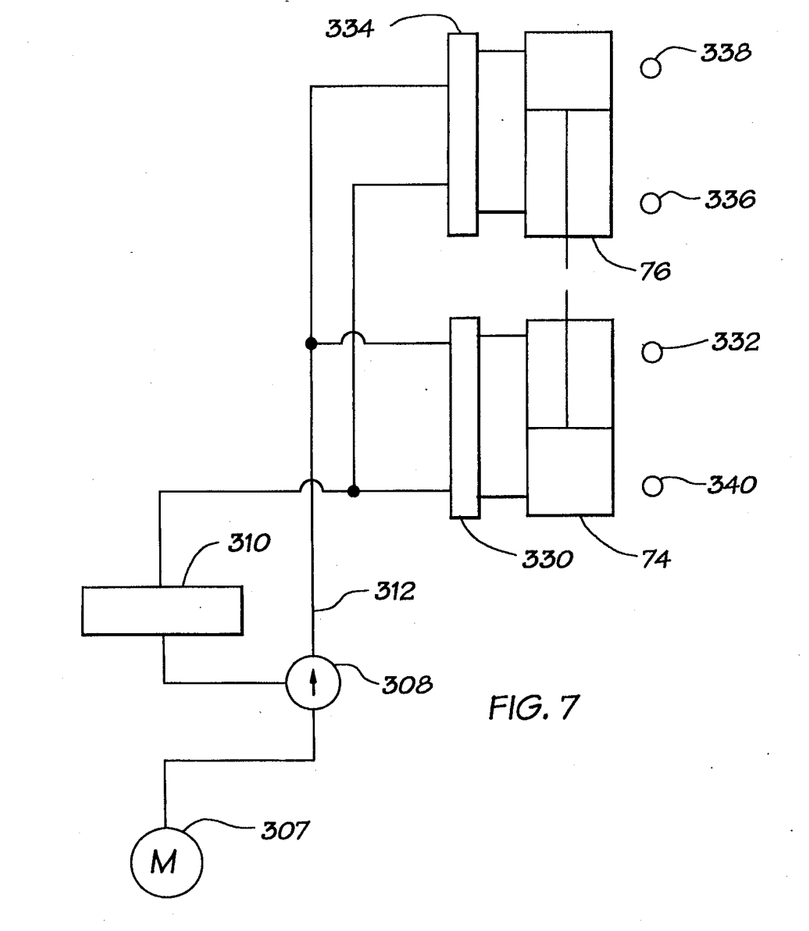
FIGS. 7, 7A and 7B are schematic block diagrams of a control system for controlling a cycle of operation of the first embodiment of the present invention.
Figure 7A:
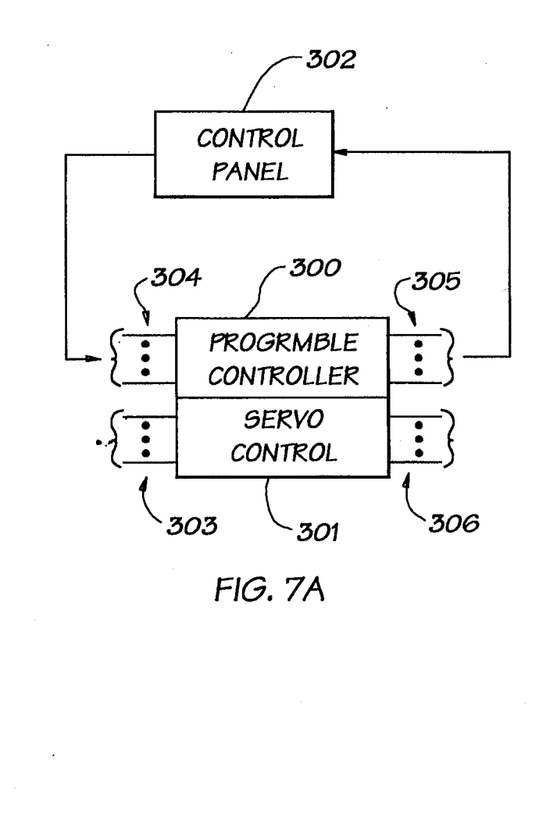
Figure 7B:
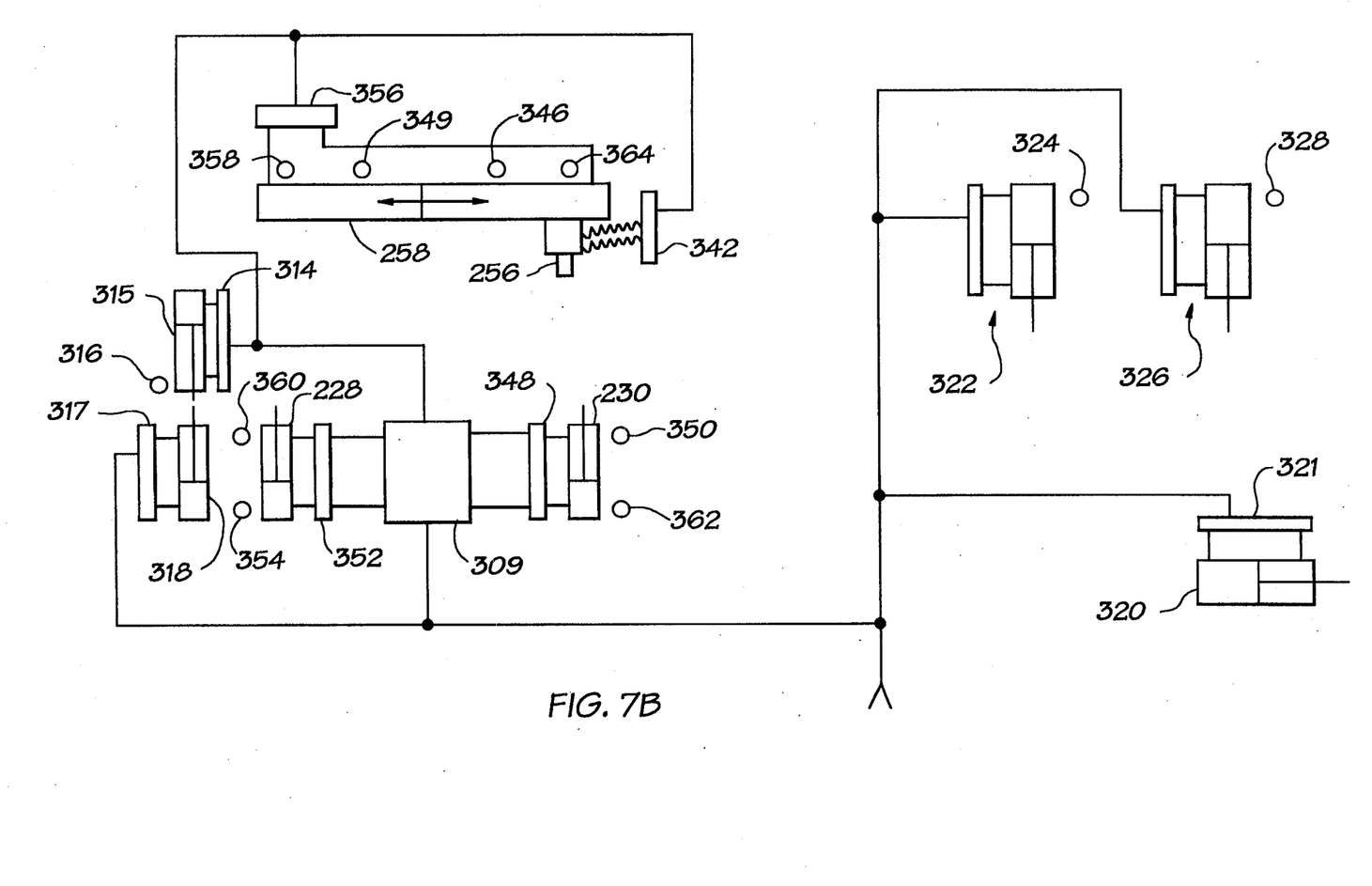

FIGS. 7, 7A and 7B are schematic block diagrams of the hydraulic, pneumatic and electrical controls associated with the first embodiment of the tube cutting machine described above. Referring to FIGS. 7, 7A and 7B, a programmable controller 300, such as an Allen Bradley SLC-502, and a servo controller 301, such as an Allen Bradley IMC-110, are used to provide overall control of the tube cutting machine. A first set of input signals 304 to the programmable controller 300 is produced by an operator control panel 302 which includes a touchscreen interface, push buttons and switches. Other input signals 303 are provided by proximity switches, photoelectric sensors, and other input devices. The programmable controller contains a logic program which is responsive to the inputs and provides various output signals so that the desired cycle of operation is executed. The servo controller 301 also contains a logic program that receives input data from the programmable controller 300 and other outside inputs 305. The servo controller 301 also provides various output signals to the programmable controller and to the servo drive system.

Output signals 305 may include operator control panel displays to the touchscreen such as indicator lights, servo position, and a parts cut counter. Output 306 will energize solenoids, motor starters, hydraulic and pneumatic directional valves and other output devices. The specific wiring connections between the input and output devices and the controller are deemed to be within the skill in the art and are not shown.

The control panel 302 permits the operator to initialize the system by providing input signals to enable the hydraulic and servo drive systems. In response to those input signals, the programmable controller 300 will produce an output signal to start hydraulic motor 307 which is connected to hydraulic pump 308. Hydraulic fluid from a reservoir tank 310 is pumped to pressure line 312. Hydraulic pump 308 supplies hydraulic fluid to cylinders 74 and 76, providing vertical and horizontal movement, respectively, of the movable die in the cutting head. A source of pressurized air, such as manifold block 309, provides fluid power to the arbor support cylinders 228 and 230, unload cylinder 258, unload grippers or gripping jaws 256, as well as other devices that may be pneumatically powered. An index cylinder 320 indexes the new tube to be loaded. A tube snubber 322, with associated proximity switch 324, holds the tube in place when the carriage 67, associated with feed clamp 326 and proximity switch 328, goes to its return position.

Figure 8A:
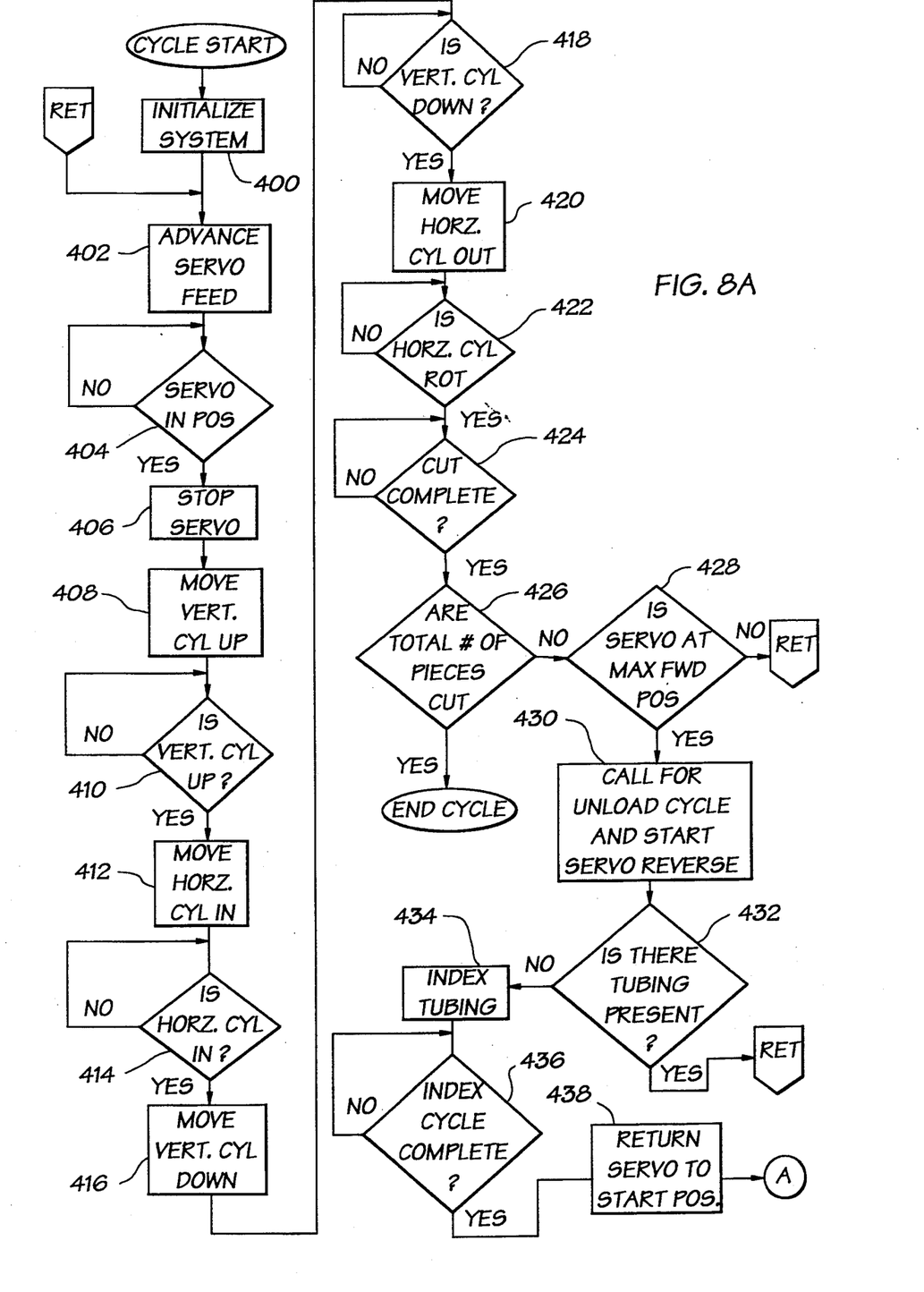
FIGS. 8A, 8B, and 8C are flowchart illustrations of process steps executed in performing a cycle of operation using the first embodiment of the present invention.
Figure 8B:
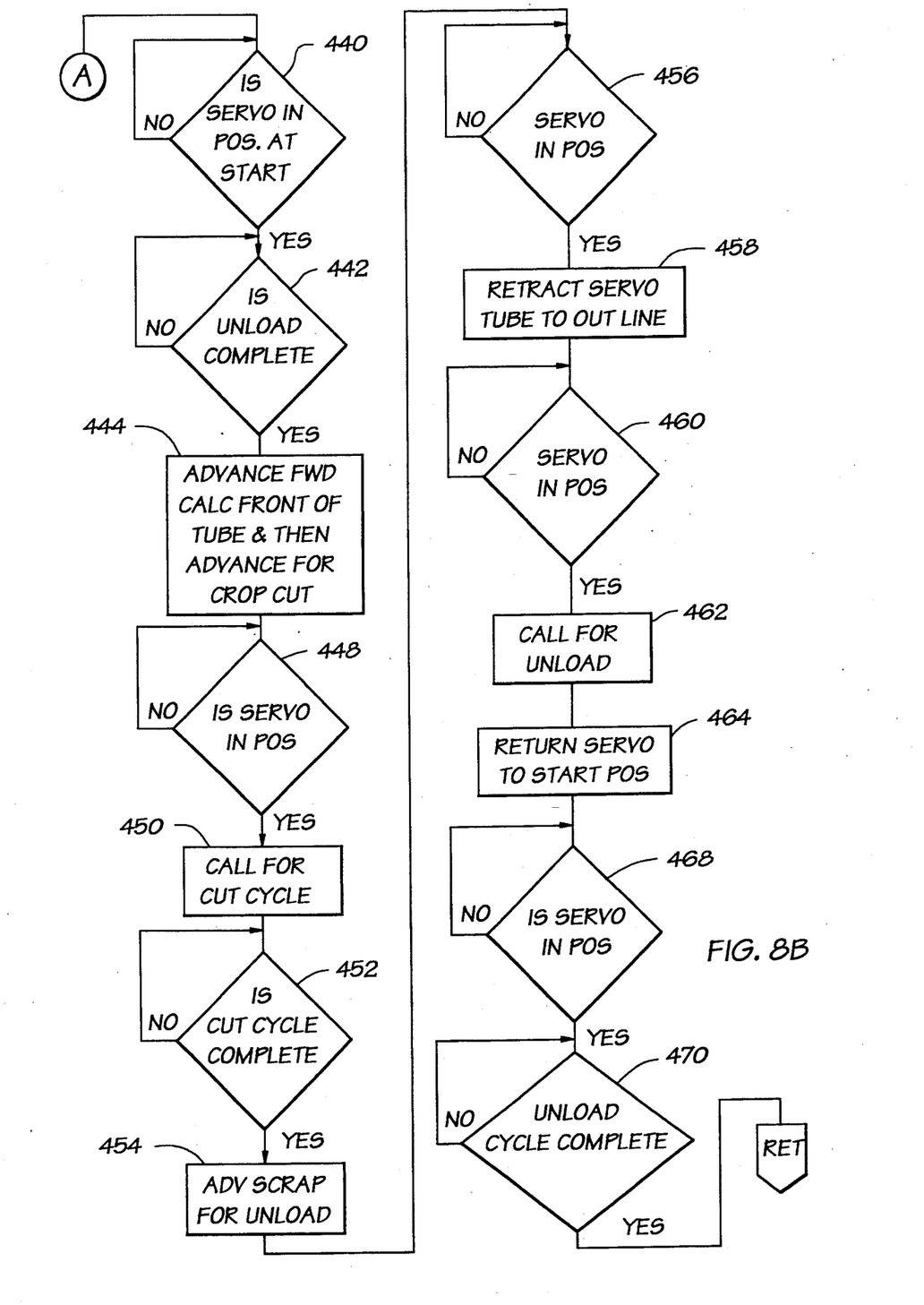
Figure 8C:
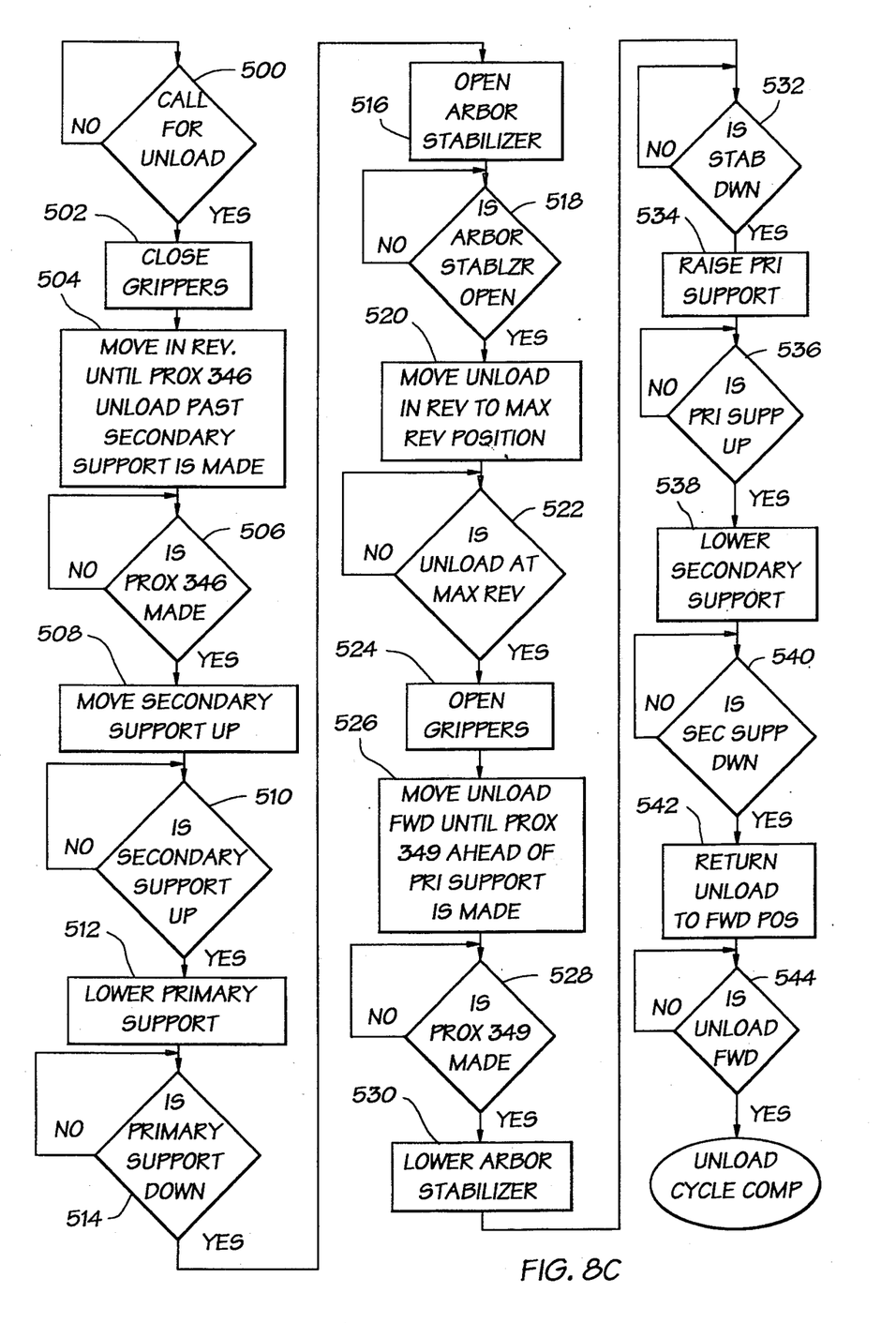

FIG. 8 is a flow diagram illustrating the process steps required to execute a typical cycle of operation. A cycle of operation will now be described with reference to FIGS. 7, 7A, 7B, 8A, 8B, and 8C, as well as FIGS. 1 through 6 describing the machine. The operator initializes the system at process step 400 by starting the hydraulic and servo drive systems, clamping the arbor with the primary arbor support 84, inputting the length of cut, inputting the number of pieces to be cut, and loading tubing segments into the magazine 56. The operator initiates a cycle of operation via one of the control panel inputs 304. At step 402 the servo feed motor 72 is commanded to feed the tubing through the input side 53 of the tube cutting head 54 by the feed carriage, which has a self centering tube grasp clamp system to hold the tube. At step 404 the controller determines if the servo 72 is in position after feeding the tubing the amount which was input into the control panel 302. Once the servo is in position, it is commanded to stop at step 406.

After the servo is stopped in position, the programmable controller 300 produces an output signal at process step 408 to the hydraulic directional valve 330 to operate the cylinder 74. This causes the movable die 151 to move vertically upward. At step 410, the controller detects completion of the vertical cut by sensing the proximity switch 332, detecting the end of the upward stroke of the movable die. At step 412, the controller 300 produces an output signal to energize directional valve 334, thereby operating cylinder 76 and moving the movable die in a horizontal direction. Next the process at step 414 detects completion of the horizontal cut by using proximity switch 336 to detect when the movable die is at the end of its horizontal stroke. Thereafter, at step 416, the process requires the controller 300 to produce an output signal to directional valve 330 to return the cylinder 74 to its starting position. At step 418, the controller detects the completion of the vertical cylinder return by sensing proximity switch 340. When proximity switch 340 has been detected, the controller 300, at step 420, generates an output signal to directional valve 334 to return horizontal cylinder 76. At step 422, the controller detects the completion of the horizontal cylinder return by sensing proximity switch 338.

At step 424, proximity switches 338 and 340 determine when the movable die has returned to its home position in both the vertical and horizontal directions. When those positions are detected, a tubing piece has then been cut and separated from the tubing segment being fed into the machine, which completes step 424. Thereafter, at process step 426, the controller 300 checks to see if the total number of pieces to be cut by the machine is true, i.e., the total number to be cut has been cut, or false. If the total number of pieces to be cut has been cut, the cycle ends. If not, the controller continues to process step 428 where the controller determines if the feed carriage 67 is at its maximum forward travel position. If it is determined that the feed carriage is not at its maximum forward travel position, then the controller 300 returns the cycle to process step 402 to repeat the feed of the tube segment and the cutting cycles.

The tube is then clamped and servo-advanced on carriage 67 to the cutoff position. At this point, the machine cycles to shear the tube to the proper cutoff length. The sheared tube, by the advancement of the next tube to be cutoff, causes the previously cutoff tube to advance towards the trailing arbor 80 downstream from the cutting head.

The number of pieces that are cut per feed cycle is generally a function of the range of applications for which the tube cutting machine has been designed. For example, the machine may be designed to cut tubing pieces in which the largest of such pieces is 48 inches (1220 mm). The machine will be designed such that the primary support 84, at a first point, has a minimal separation from the secondary arbor support 86, at a second point, sufficient to accept a tubing piece of 48 inches (1220 mm). Therefore, the process at step 428, with the servo at maximum forward position, would equate to cut tubing pieces of 48 inches (1220 mm). The 48 inch (1220 mm) limit would be established by the manufacturer and then the machine user would enter cut lengths up to and including 48 inch (1220 mm) long cutoffs using control panel inputs 302.

Given the above data, the controller calculates and monitors the servo feed carriage position. After the feed carriage reaches its maximum forward position, at step 430, the controller 300 produces output signals to energize solenoid 342 causing the gripper 254 to grasp a cut tubing piece adjacent to the cutting head. In addition, an output signal causes directional valve 356 to operate cylinder 258 to move the gripper 254 and the tubing pieces on the arbor 80 to the left toward the end of the machine 92 remote from the cutting head 54. It should be noted that depending on the size of the cut tubing pieces, the gripper may be able to grasp either a first tubing piece immediately adjacent the cutting head or a second tubing piece further down the arbor. If the second piece is grasped, the first piece will remain next to the cutting head while the gripper moves the other pieces down the arbor. Once the servo 72 reaches its maximum forward position, the controller signals the machine to do a shuttle unload cycle. This shuttle unload cycle is used to push the cut pieces into the idle zone between the primary and the secondary arbor supports 84, 86.

The controller 300 receives a signal from the servo control at process step 500 for a shuttle unload cycle. At step 502 the controller 300 generates an output signal to solenoid 342, causing gripper 254 to operate. At the same time, the controller outputs a signal to solenoid 356 causing the unload cylinder to travel toward the unload end 92 of the machine at step 504. Process step 506 detects proximity switch 346 which sends an input signal to controller 300. The controller 300 then generates an output signal at step 508 to solenoid 348, causing the secondary support cylinder 230 to extend to retain the arbor on secondary arbor support 86. At step 510 the controller detects that the secondary support 86 is in position by sensing proximity sensor 350. When proximity switch 350 has been detected, an output signal is generated at step 512 to energize solenoid 352, which causes cylinder 228 to retract primary arbor support 84 from the arbor. At step 514 the controller 300 detects that the primary support has retracted by sensing proximity switch 354. When proximity switch 354 has been detected, controller 300 generates an output signal to energize solenoids 314 and 317 to open or retract arbor stabilizer cylinder 315 and arbor stabilizer support cylinder 318, respectively, at step 516.

The arbor stabilizer cylinder 315 and the arbor stabilizer support cylinder 318 stabilize the arbor 80 as the primary arbor support 84 actuated by cylinder 228 disengages the arbor during the unload cycle. The cylinders 315 and 318 remain extended and then open until the primary arbor support completely disengages the arbor. The process at step 518 detects that the arbor stabilizer cylinder 315 and the arbor stabilizer support cylinder 318 have been retracted by sensing proximity switch 316. At step 520, the controller 300 generates an output signal to energize solenoid 356 to cause unload cylinder 258 (FIG. 3) and gripper 254 to travel to the end of the machine 92. At step 522, proximity switch 358 is detected by controller 300, indicating that unload cylinder 258 has reached the end of the machine 92. This in turn causes controller 300 to deenergize directional valve 356, thereby stopping cylinder 258; to energize directional valve 342 to open grippers 256 at step 524; and to energize directional valve 356 at step 526 to cause the unload cylinder 258 to travel back towards cutting head 54.

Process step 528 detects proximity switch 349 which sends an input signal to controller 300. The controller 300 then deenergizes directional valve 356, stopping the movement of the unload cylinder 258. The controller 300 also generates an output signal to energize directional valves 314 and 317 at step 530 to lower arbor stabilizer cylinder 315 and to raise arbor stabilizer support cylinder 318. When the controller 300 stops receiving an input from proximity switch 316, step 532 is complete and then at step 534 the controller generates an output to energize directional valve 352 operating cylinder 228 to engage the arbor 80.

The process at step 536 determines when the proximity switch 360 has detected that the primary support 84 has engaged with arbor 80. When that position is detected at step 536 by proximity switch 360, the controller 300 at step 538 generates an output signal to directional valve 348. This output signal causes operation of the cylinder 230, disengaging the secondary arbor support 86 from the arbor 80. When that position is detected at step 540, by proximity switch 362, the controller, at step 542, generates an output signal to energize directional valve 356 to return the grippers to their start position next to the cutting head 54. When this position is detected at step 544 by proximity switch 364, the unload shuttle cycle is complete.

As the cut tubing pieces are being unloaded, the feed carriage retracts to obtain a fresh grasp of the tube being cut, on the upstream side of the cutting head, at process step 430. During the carriage retract, a photoelectric sensor built into the carriage searches for the end of the tube, at process step 432. If the photoelectric sensor does not sense the end of the tube, the feed carriage returns to its starting position and the cutting cycle continues. If, during the carriage return, the photoelectric sensor does sense the end of the tube, the machine calculates the carriage position and signals the machine the relative position of the tube end. The controller 300 then calculates if any more cuts can be made, based on the current carriage position and the length of cut input by the operator at control panel 302. Then at process step 434 the controller 300 generates an output to operate the directional valve 321, causing index cylinder 320 to operate and drop a new tube segment, completing step 436. When step 436 is complete, step 438 causes the carriage to return to its starting position, completing step 440. At this point, the controller checks step 442 for the unload cycle complete. When step 442 is true, i.e., the unload cycle is complete, the controller 300 continues to step 444 where the new tube is grasped and the servo feed carriage is advanced toward the cutting head 54. As the tubing is being advanced forward, it passes another photoelectric sensor and the controller 300 calculates the relative new tube end position.

Through programming, the machine is capable of handling the crop cut. Hence, the machine of the present invention has semi-intelligence to shuttle the cut pieces downstream and work continuously without a mechanical stop finger to determine the tube cut-off length.

The processes described in FIGS. 8A, 8B, and 8C may be readily programmed in a programmable controller by one skilled in the art. It should also be noted that the elements described as hydraulic actuators may, upon design choice, be replaced by pneumatic or electric actuators. Similarly, proximity switches may be replaced by limit switches or other position detectors. It is also possible that the actuators may be designed to have fixed stroke limits such that no position detector is required and that the actuator is merely moved from the extent of one limit to the extent of an opposing limit.

While the invention has been illustrated in some detail according to the preferred embodiments shown in the accompanying drawings and while the preferred embodiments have been described in some detail, there is no intention to limit the invention to such detail. On the contrary, it is intended to cover all modifications, alterations and equivalents falling within the spirit and scope of the appended claims.

What is claimed is:

1. An apparatus for cutting lengths of tubing into tubing pieces, the apparatus comprising:
   feed means for feeding the lengths of tubing from a front end of the apparatus;
   carriage means for receiving the lengths of tubing, the carriage means including a first detection means for detecting the leading edge of the tubing and a second detection means for detecting the trailing edge of the tubing;
   cutting head means for cutting the lengths of tubing into the tubing pieces, said cutting head means having fixed and movable punches with a predetermined alignment with fixed and movable dies, said cutting head means further having an input side for receiving the lengths of tubing to encircle said punches, and an output side from which tubing pieces exit the cutting head means;
   an arbor connected to one of the punches and extending from the output side of the cutting head; and
   transport means for receiving the tubing pieces and moving the tubing pieces to an end of the apparatus remote from the cutting head means whereby the lengths of tubing and tubing pieces have a unidirectional material flow from the feed means to past a rear end of the apparatus.

2. The apparatus of claim 1 wherein the apparatus further comprises:
   means for storing a length of tubing; and
   means for transferring the length of tubing from the storage means to the feed means.

3. The apparatus of claim 1 wherein the transport means further comprises:
   first means for securing the arbor to maintain the predetermined alignment of the one of the punches with the dies;
   second means for securing the arbor to maintain the predetermined alignment of the one of the punches with the dies;
   gripper means associated with the carriage means for selectively grasping and releasing one of the tubing pieces;
   shuttle means for moving the gripper means between the proximity of the cutting head means and the end of the apparatus; and
   means for causing the first and second securing means to alternatively engage and disengage the arbor in response to the shuttle means moving the gripper means between the proximity of the cutting head means and the end of the apparatus and further causing the tubing pieces to be discharged from the end of the apparatus.

4. The apparatus of claim 1 wherein the carriage means further comprises retraction means for retracting the carriage means as the tubing pieces are moved to the end of the apparatus remote from the cutting head means, to grip a length of tubing to be cut.

5. The apparatus of claim 4 wherein the carriage means further comprises:
   sensor means associated with the carriage means for detecting a trailing end of a length of tubing;
   carriage position means for calculating position of the carriage means; and
   signal means for signaling the relative position of the trailing end of the length of tubing.

6. The apparatus of claim 4 wherein the carriage means further comprises:
   sensor means associated with the carriage means for detecting a leading end of a length of tubing;
   carriage position means for calculating position of the carriage means; and
   signal means for signaling the relative position of the leading end of the length of tubing.

7. An apparatus for cutting tubing, the apparatus comprising:
   feed means for feeding the tubing;
   carriage means for receiving the lengths of tubing, the carriage means including a first detection means for detecting the leading edge of the tubing and a second detection means for detecting the trailing edge of the tubing;
   a cutting head having fixed and movable punches in a predetermined alignment within fixed and movable dies for cutting the tubing into tubing pieces, said tubing entering the cutting head on an input side, encircling said punches, and exiting the cutting head on an output side;

an arbor having a front end connected to one of the punches and extending from the output side of the cutting head;

first means for securing the arbor to maintain the predetermined alignment of the one of the punches with the dies; and second means for securing the arbor to maintain the predetermined alignment of the one of the punches with the dies;

transport means for advancing cut tubing pieces along said arbor past a rear end of said arbor.

8. The apparatus of claim 7 wherein the apparatus further comprises means connected to the first and second securing means for shifting the first and second securing means, the arbor and the one of the punches relative to the dies thereby permitting the predetermined alignment to be set and adjusted.

9. The apparatus of claim 7 wherein each of the first and second securing means includes means for limiting movement of the arbor and movable punch in a direction parallel to a longitudinal axis of the arbor.

10. The apparatus of claim 7 wherein each of the first and second securing means includes means for limiting rotational movement of the arbor about the longitudinal axis.

11. The apparatus of claim 10 wherein each of said first and second securing means is comprised of a V-shaped groove capable of mating with a V-block.

12. A process for providing a unidirectional flow of tubing on a tube cutting machine from an input side of a cutting head to an end of the machine remote from an output side of the cutting head, said cutting head including a punch contiguous with an arbor extending from the output side of the cutting head to the end of the machine, the process comprising the steps of:

(a) securing the arbor at a first point a predetermined distance from the cutting head;

(b) feeding tubing into the input side of the cutting head to encircle the punch;

(c) receiving the lengths of tubing on a carriage, the carriage including a first detection means for detecting the leading edge of the tubing and a second detection means for detecting the trailing edge of the tubing;

(d) cutting the tubing to produce a tubing piece on the arbor on the output side of the cutting head;

(e) transporting a tubing piece from a first location past the first point to a second location in the proximity of the end of the machine to discharge the tubing piece from the machine.

13. The process of claim 12 wherein the step of receiving the lengths of tubing on a carriage further comprises the step of retracting the carriage as the tubing pieces are moved to the end of the apparatus remote from the cutting head means, to grip a length of tubing to be cut.

14. The process of claim 13 wherein the step of receiving the lengths of tubing on a carriage further comprises the steps of:

detecting a trailing end of a length of tubing;
calculating carriage position; and
signaling the relative position of the trailing end of the length of tubing.

15. The process of claim 13 wherein the step of receiving the lengths of tubing on a carriage further comprises the steps of:

detecting a leading end of a length of tubing;
calculating carriage position; and
signaling the relative position of the leading end of the length of tubing.

* * * * *